United States Patent
Jiménez (10) Patent No.: US 11,432,127 B2
(45) Date of Patent: Aug. 30, 2022

(54) METHODS OF PROVIDING AND OBTAINING ACCESS TO IOT RESOURCES

(71) Applicant: Telefonaktiebolaget LM Ericsson (publ), Stockholm (SE)

(72) Inventor: Jaime Jiménez, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 172 days.

(21) Appl. No.: 16/757,463

(22) PCT Filed: Oct. 20, 2017

(86) PCT No.: PCT/EP2017/076866
§ 371 (c)(1),
(2) Date: Apr. 20, 2020

(87) PCT Pub. No.: WO2019/076466
PCT Pub. Date: Apr. 25, 2019

(65) Prior Publication Data
US 2021/0195393 A1    Jun. 24, 2021

(51) Int. Cl.
*H04W 4/80*        (2018.01)
*G16Y 10/75*       (2020.01)
*H04W 12/0471*     (2021.01)
*H04L 67/02*       (2022.01)
*H04L 67/04*       (2022.01)

(52) U.S. Cl.
CPC ............ *H04W 4/80* (2018.02); *G16Y 10/75* (2020.01); *H04L 67/02* (2013.01); *H04L 67/04* (2013.01); *H04W 12/0471* (2021.01)

(58) Field of Classification Search
CPC .... H04W 4/80; H04W 12/0471; G16Y 10/75; H04L 67/04; H04L 67/02; H04L 29/08
See application file for complete search history.

(56) References Cited

U.S. PATENT DOCUMENTS

2016/0179462 A1    6/2016  Bjorkengren
2017/0208139 A1*   7/2017  Li ......................... H04W 4/70

FOREIGN PATENT DOCUMENTS

WO    WO 2016154129 A1    9/2016

OTHER PUBLICATIONS

International Search Report and Written Opinion of the International Searching Authority, PCT/EP2017/076866, dated Feb. 20, 2018, 12 pages.
Shelby, Z., et al., "CoRE Resource Directory," IETF, Feb. 25, 2013 (XP015092184) <draft-shelby-core-resource-directory-05> 27 pages.
(Continued)

*Primary Examiner* — Tuan H Nguyen
(74) *Attorney, Agent, or Firm* — Sage Patent Group (57) ABSTRACT

A method of providing access to IoT resources is provided. The method is performed by a Bluetooth low energy, BLE, tag supporting a Bluetooth wireless technology standard. The method comprises broadcasting a reference to a resource directory comprising reachability information to one or more Internet of Things, IoT, resources and supporting a Constrained Application Protocol, CoAP. A corresponding method performed by a communications device is also provided, and a BLE tag, a communications device, computer programs and computer program products.

19 Claims, 5 Drawing Sheets

(56) References Cited

OTHER PUBLICATIONS

Jameel, M. I., et al., "Low-Power Wireless Advertising Software Library for Distributed M2M and Contextual IoT," 2015 IEEE $2^{nd}$ World Forum on Internet of Things (WF-IOT) Dec. 14, 2015 (XP032854127) 6 pages.
Selander, G. et al.; "Object Security of CoAP (OSCOAP)", draft-ietf-core-object-security-03; SICS Swedish ICT; May 3, 2017; 44 pages.
Google/Physical-Web; "physical-web/documentation/technical_overview.md"; Apr. 18, 2017; 3 pages.
RuuviTag; "Open Source Bluetooth 4.2 Sensor Beacon"; https://tag.ruuvi.com; Aug. 18, 2017; 6 pages.

* cited by examiner

METHODS OF PROVIDING AND OBTAINING ACCESS TO IOT RESOURCES

CROSS REFERENCE TO RELATED APPLICATIONS

This application is a 35 U.S.C. § 371 national stage application of PCT International Application No. PCT/EP2017/076866 filed on Oct. 20, 2017, the disclosure and content of which is incorporated by reference herein in its entirety.

TECHNICAL FIELD

The present disclosure relates generally to the field of wireless communications, and in particular to a method of providing access to IoT resources, a method of obtaining access to IoT resources and corresponding devices, computer programs and computer program products.

BACKGROUND

A Bluetooth Low Energy (BLE) tag transmits information, or is "beaconing". The sole task of such advertising tag (BLE tag in the following) is to broadcast a Uniform Resource Locator (URL) to the surrounding area, ensuring that even a large number of devices in an area with many people are accommodated. By making each such BLE tag broadcast constantly, any number of nearby scanning devices (e.g. communications devices such as smartphones) can pick up the information passively with little conflict. This broadcast only approach avoids an N-squared problem of every scanning device connecting to every BLE tag.

The BLE tag broadcasts the URL in an advertising packet, comprising a Universally Unique IDentifier (UUID) for each specific service that is broadcast. These so called beacons sent by the BLE tag often use an Eddystone-URL format, which is designed to carry URLs in a compressed fashion. The BLE tag can hence be seen as a non-connectable advertiser transmitting the internally stored URL, wherein the URL may be to a particular Internet website, a brand etc. As another example, the BLE tag may be a temperature sensor broadcasting a current temperature.

Figure 1:
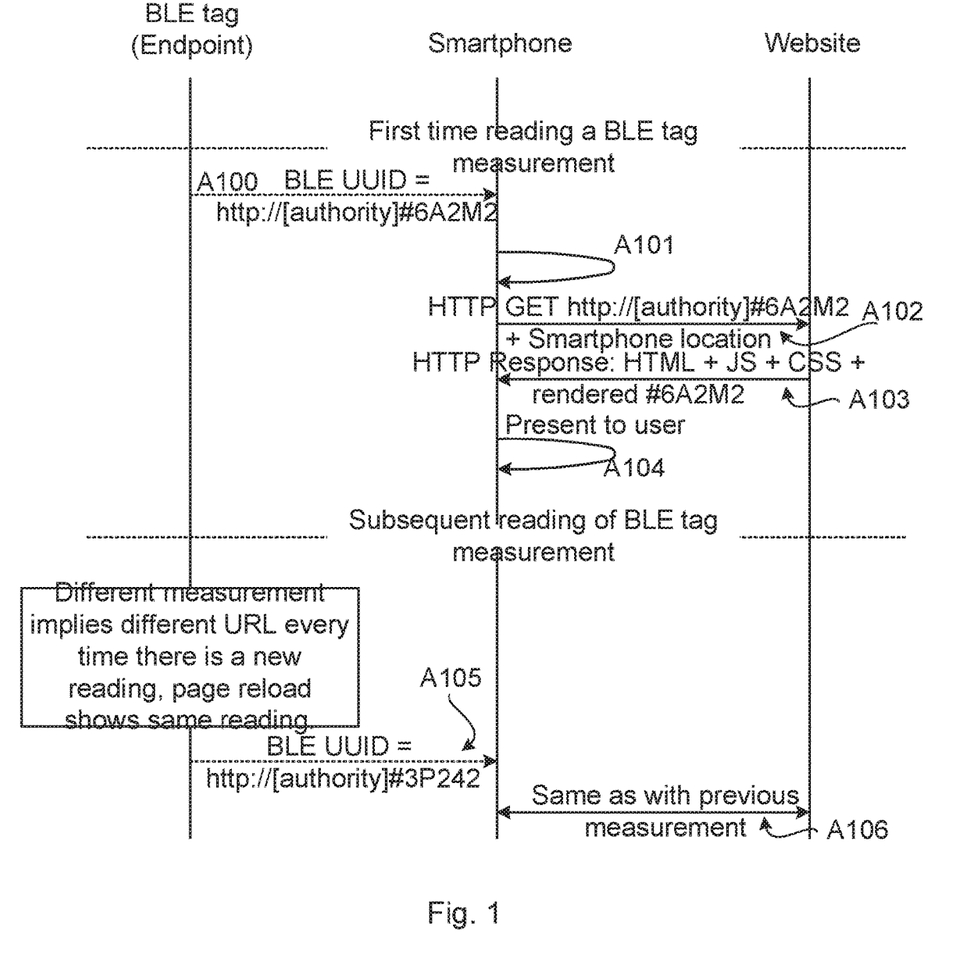
FIG. 1 is a sequence diagram illustrating a known mechanism of a Bluetooth low energy tag using Bluetooth low energy beacons.

FIG. 1 is a signalling diagram illustrating a current mechanism of the BLE tag (endpoint) using BLE beacons. In the context of Internet of Things (IoT) what can be broadcasted is a specific measurement of a BLE device, which the BLE tag may (but need not) be an integrated part of or co-located with. The BLE tag thus broadcasts the URL (arrow A100) with its measurements appended at the end in Eddystone format (http://[authority]/#6A2M2), wherein the measurements themselves are encoded after the "#" symbol.

The Smartphone or other reading device picking up (arrow A101) the broadcasting follows the provided URL to the website, adding its own location information (arrow A102).

The website will then provide the measurement (arrow A103) with the appropriate settings, e.g. Hypertext Markup language (HTML), JavaScript (JS), Cascading Style Sheets (CSS) specifying fonts, size etc. and the information is presented (arrow 104) to the user on his/her smartphone.

SUMMARY

Typically, the URL is pointing to a brand, a shop, a store or other representative website. A drawback of the prior art, identified by the inventor of the present disclosure, is that when applied to IoT it basically misuses the concept of URL and Representational state transfer (REST) by appending the actual resource values to the URL every time. When a user reloads (arrow A 105) the webpage, e.g. on her smartphone expecting a new value, it will instead render the same previous value since the resource measurement is encoded in the URL (arrow A106).

The BLE tag will broadcast a different URL whenever the measurement changes, thus forcing the user to find the beacon once again. This will draw battery of the user's device, and may also entail costs.

Another drawback is that the current solution requires internet connectivity in order to get the measurement displayed. The vendors thereby obtain the location of the user from the smartphone and are able to best market and sell their services.

An objective of the present disclosure is to address and improve various aspects for BLE devices. A particular objective is to enable communications devices to have a reliable and efficient connection directly to IoT resources. This objective and others are achieved by the methods, devices, computer programs and computer program products according to the appended independent claims, and by the embodiments according to the dependent claims.

The objective is according to an aspect achieved by a method of providing access to IoT resources. The method is performed by a Bluetooth low energy, BLE, tag that supports a Bluetooth wireless technology standard. The method comprises broadcasting a reference to a resource directory comprising reachability information to one or more Internet of Things, IoT, resources and supporting a Constrained Application Protocol, CoAP.

The method provides a number of advantages. The present teachings take advantage of and benefit from modern application layer protocols for Constrained Devices, which is in contrast to the prior art solution. In the various embodiments according to different aspects of the present teachings, enhancements in this regards are provided. The method allows for local communication between a BLE tag and smartphone without the need to connect to a server on the Internet. This in turn provides advantages such as typically being free of charge for the user and often also entails an improved user experience in that a more reliable connection is provided. Further, the method introduces security at the application layer, which protects the advertisement from eavesdroppers.

The objective is according to an aspect achieved by a computer program for a Bluetooth low energy, BLE, tag for providing access to IoT resources. The computer program comprising computer program code, which, when run on at processing circuitry of the BLE tag causes the BLE tag to perform the method as above.

The objective is according to an aspect achieved by a computer program product comprising a computer program as above and a computer readable means on which the computer program is stored.

The objective is according to an aspect achieved by a Bluetooth low energy, BLE, tag for providing access to IoT resources. The BLE tag supports a Bluetooth wireless technology standard and is configured to broadcast a reference to a resource directory comprising reachability information to one or more Internet of Things, IoT, resources and supporting a Constrained Application Protocol, CoAP.

The objective is according to an aspect achieved by a method of obtaining access to IoT resources. The method is performed by a communications device and comprises receiving, from a Bluetooth low energy, BLE, tag, a reference to a resource directory comprising reachability information to one or more Internet of Things, IoT, resources and supporting a Constrained Application Protocol, CoAP; transmitting, to the BLE tag, a request for a list of reachability information to the at least one IoT resource; and receiving in response thereto the list of reachability information to each of one or more IoT resources.

The objective is according to an aspect achieved by a computer program for a communications device for obtaining access to IoT resources. The computer program comprises computer program code, which, when run on at processing circuitry of the communications device causes the communications device to perform the method as above.

The objective is according to an aspect achieved by a computer program product comprising a computer program as above and a computer readable means on which the computer program is stored.

The objective is according to an aspect achieved by a communications device for obtaining access to IoT resources. The communications device is configured to: receive, from a Bluetooth low energy, BLE, tag, a reference to a resource directory comprising reachability information to one or more Internet of Things, IoT, resources and supporting a Constrained Application Protocol, CoAP, transmit, to the BLE tag, a request for a list of reachability information to the at least one IoT resource, and receive in response thereto the list of reachability information to each of one or more IoT resources.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Currently, and as described in the background section, the BLE tag broadcast the URLs of specific services, vendors etc. According to the present teachings, the URLs are instead pointing to a resource directory with links to IoT resources, comprising e.g. sensors sensing temperature, humidity, air pressure etc. In contrast to prior art, internet connectivity is therefore not needed in order to get the measurement displayed, which is advantageous for the user.

As also described in the background section BLE tags are at their core simple advertising endpoints. According to various aspects, the present teachings instead propose to enhance the BLE tags by using modern constrained protocols and provide the user with a secure and efficient lookup service for his/her devices and communications devices such as smartphones. The BLE tags are used in order to advertise lookup entry points for IoT, so that smartphone users can interact in a more natural way with their immediate surroundings.

Figure 2:
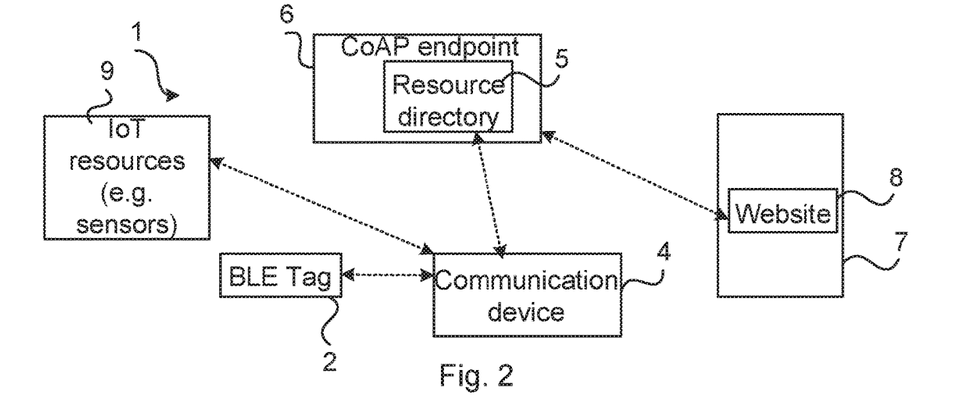
FIG. 2 illustrates an environment in which various embodiments according to the present teachings may be implemented.

FIG. 2 illustrates an environment in which various embodiments according to the present teachings may be implemented. The environment may, for instance, be an airport, where there typically is a large number of persons awaiting and often using their communications devices 4. Other examples of environments which may benefit from the various embodiments according to the present teachings comprise industrial environment, such as an industrial process plant, or railway stations, subway stations, sport event gatherings etc. The communications device 4 may, for instance, be a smart phone, a personal digital assistant (PDA), laptop or any other type of communications device having a user interface.

The BLE tag 2 is provided with a constrained protocol, such as e.g. Constrained Application Protocol (CoAP). In the following CoAP is used as an example of such constrained protocol, but it is noted that the BLE tag 2 could use any other such protocol, for instance, Hypertext Transfer Protocol (HTTP), H2 or any other REST-based protocol. The BLE tag 2 broadcasts Constrained Application Protocol (CoAP) URL of a Resource Directory 5, which as mentioned earlier is a directory with links to IoT resources 9. This resource directory 5 may in some embodiments be co-located with the BLE tag 2, but in other embodiments, the resource directory 5 may be located elsewhere, separate from the BLE tag 2. The resource directory 5 may be located at some distance away from the one or more BLE tags 2, as the queries from communication devices 4 to the resource directory 5 are, according to the present teachings, done over another medium than the BLE wireless technology. The user can then be presented with all available IoT devices in the surrounding area and means to connect to them. In FIG. 2, the resource directory 5 is shown as part of a CoAP endpoint 6.

The IoT resources 9 (e.g. IoT devices) may, for instance, be any type of sensor, such as sensors measuring temperature, humidity, air pressure etc. As other examples, the IoT resources 9 may be an actuator such as switches, servos or motors etc. The IoT resource 9 may in essence be any type of physical device or object able to, for instance, collect some type of data and comprising means for wireless communication in order to provide the data. According to various embodiments, the wireless communications between the IoT resources 9 and the communications device 4 can be made over any short-range wireless communications network, e.g. WiFi. The communications device 4 does not internet connectivity in order to obtain the desired service (e.g. a current temperature).

The communications device 4 having received the CoAP URL to the resource directory 5 from the BLE tag 2 is now able to receive the links stored in the resource directory 5. The communications device 4 may, in various embodiments, append credentials for authentication with the CoAP endpoint 6 hosting the resource directory 5.

Further, Object Security CoAP (OSCoAP) may be used to protect the advertisement so that only authorized communications devices 4 can read the CoAP URL that the BLE tag 2 advertises. The key used for the encryption (e.g. symmetric key or derived from a previously distributed secret) is directly transmitted through another channel, no key is transported in the message. OSCoAP defines certain fields in the CoAP header that are integrity and replay protected and optionally encrypted by the use of an OSCoAP Option. It also defines several modes, among those one named OSCON, which takes care of encrypting the payload only.

In some embodiments, the use of proxies or caching (on the communications device 4 or other intermediary) is contemplated. In such cases Datagram Transport Layer Security (DTLS) would protect only hop-by-hop, and thus the communications device 4 or gateway could be able to read and modify the information. Depending on the use case, the OSCoAP in OSCON mode may, in various embodiments, provide an improved security without the cost of the extra messaging and processing, and more importantly enabling multiple receivers (e.g. communications devices 4) to read the same content (i.e. the advertised tag) regardless of any intermediary hops.

OSCON applies well to this present disclosure's use case as we have a closed group and a single data source (i.e. the advertising tag). More details are available at [3].

Figure 3:
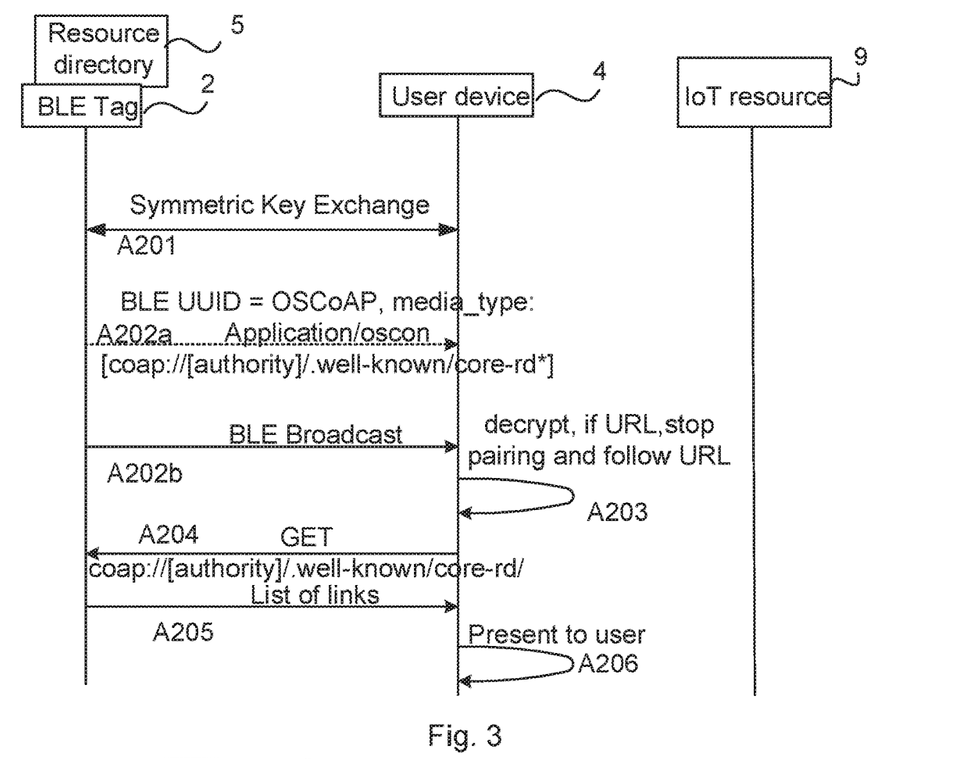
FIG. 3 is a sequence diagram illustrating embodiments according to the present teachings.

FIG. 3 is a sequence diagram illustrating various embodiments according to the present teachings. In particular, FIG. 3 illustrates how the communications device 4 is enabled to read a list of links of the resource directory (OSCON).

At arrow A201, a symmetric key exchange between the communications device 4 and the BLE advertising tag 2 may be performed, i.e., they exchange cryptographic keys. After this exchange, they are enabled to send and receive encrypted messages. It is noted that symmetric key exchange, i.e. the same keys are used for encryption and decryption, is mentioned purely as an example and that asymmetric key exchange, i.e. wherein a public key and a private key are used, may be used in various embodiments. However, since the symmetric key exchange is more lightweight than using certificates, the symmetric key exchange is used in preferred embodiments.

At arrow A202a, the BLE advertising tag 2 advertises an URL of a CoAP endpoint 6 hosting the CoAP resource directory 5, where links to IoT resources 9 can be found. As noted earlier, in some embodiments, the URL that is broadcast is encrypted, in some embodiments OSCON encrypted. The communications device 4 may then obtain the relevant key material through an out-of-band mechanism. The communications device 4 may, for instance, be preconfigured with the relevant key material by the device provider (from factory). As another example, the communications device 4 may be provided with the key material written in form of a barcode on the device itself. The relevant key material may also be provided by any other provisioning method that allows for sharing an array of data. In other embodiments, arrow A202b, the URL may also be advertised (i.e. broadcast) unencrypted, e.g. for cases wherein the information to be accessed is not sensitive.

At arrow 203, the communications device 4 decrypts the received URL (if encrypted) and stops the process of pairing to the BLE tag 2. The communications device 4 follows the received URL of the resource directory 5 comprising links to the IoT resources 9. In the illustrated case, the resource directory 5 is co-located with or hosted by the BLE tag 2 and the communications device 4 may therefore obtain the links over the connection to the BLE tag 2, but as mentioned earlier, this does not need to be the case.

At arrow 204, the communications device 4 sends a GET message to the resource directory 5 hosted by the BLE advertising tag 2 (again in this case using the connection to the BLE tag 2). The communications device 4 is able to still use OSCON encryption if so desired. This will not only prevent eavesdropping but will also protect the resource directory 5 from unwanted/unauthorized GET requests.

At arrow 205, the resource directory 5 hosted by the BLE advertising tag 2 sends the list of links to the communications device 4 which in turn presents (arrow A206) the list to the user. From that moment onwards the communications device 4 is capable of reading measurements directly from the IoT resources 9, e.g. sensors or other devices that the links points to) using CoAP or some other constrained application protocol.

It is again noted that in illustrated case the resource directory 6 is hosted on the BLE tag 2. Thus the communications device 4 communicates with the BLE tag 2 in order to receive the links. In other embodiments, the BLE tag 2 only provides the link to the resource directory 6, which may be hosted in another CoAP enabled device. The communications device 4 then communicates with the CoAP enabled device in order to get the links to the IoT resources 9. This is true also for FIGS. 4 and 5.

Figure 4:
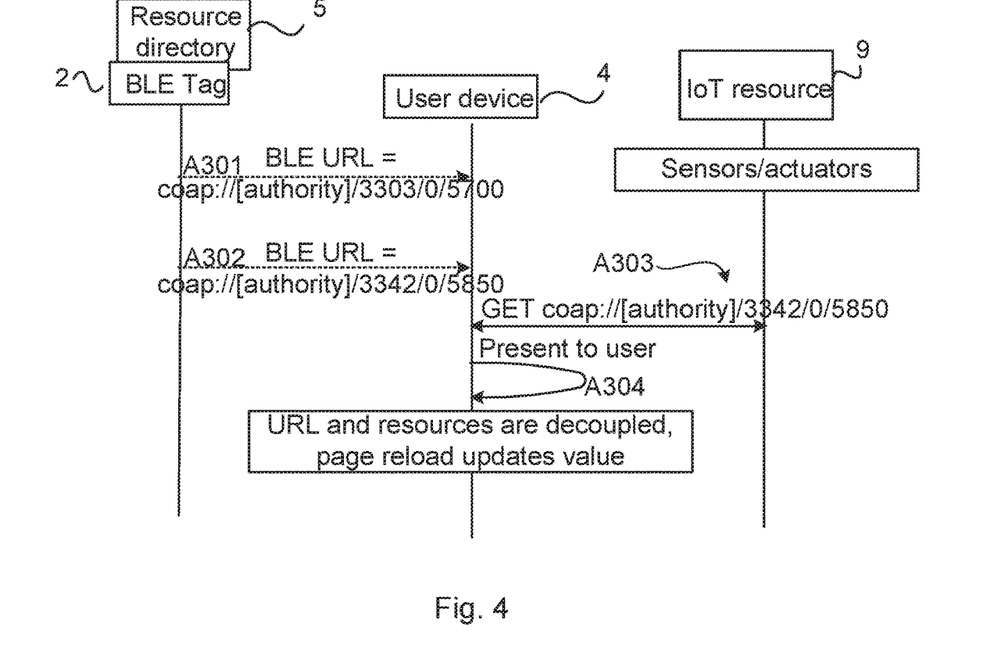
FIG. 4 is a sequence diagram illustrating various embodiments according to the present teachings.

FIG. 4 is a sequence diagram illustrating various embodiments according to the present teachings. In particular, FIG. 4 illustrates how a measurement can be read locally, i.e. as opposed to obtaining the value from a website 8 on a server 7 of e.g. Internet (see FIG. 2).

The communications device 4 thus now has a list of links to various IoT resources 9. The links may, for instance, point to a respective sensor. In FIG. 4, two such links which the user can select are illustrated: a first link (arrow 301) coap://[authority]/3303/0/5700 and a second link (arrow 301) coap://[authority]/3342/0/5850.

At arrow A303, the communications device 4 obtains e.g. a measurement directly from an IoT resource 9, e.g. a sensor, by using the second URL link to find the IoT resource. The communications device 4 obtains the measurement by a GET command sent to the IoT resource 9, and is then able to present the measurement to the user (arrow A304), e.g. on a display of the communications device 4.

It is noted that the URL links to the IoT resources (stored in the resource directory 5) and the IoT resources 9 are decoupled, i.e. does not comprise the actual measurement value as in prior art. This means that the when the URL is reloaded, an updated value is obtained. Each such page reload thus updates the measurement value.

Figure 5:
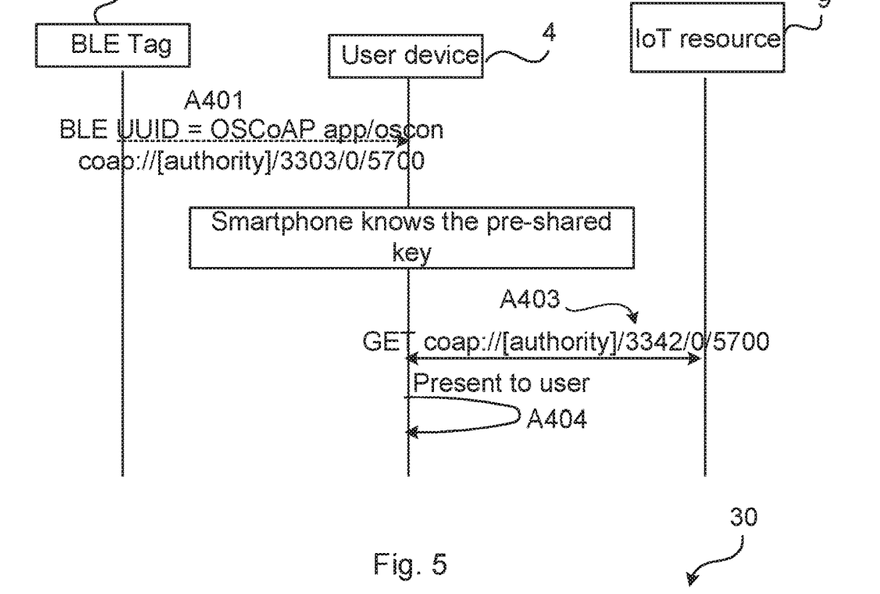
FIG. 5 is a sequence diagram illustrating various embodiments according to the present teachings.

FIG. 5 is a sequence diagram illustrating various embodiments according to the present teachings. In particular, FIG. 5 illustrates how measurements can be securely broadcasted. As mentioned in relation to FIG. 3, the communications device 4 and the BLE advertising tag 2 can exchange encryption keys. Hence, when the BLE advertising tag 2 broadcasts the URL, this broadcasting can be encrypted (arrow A401). Since the communications device 4 knows the pre-shared key, it is able to decrypt the broadcast message and follow the link of this message and thus obtain (arrow A403) the measurement directly from the IoT resource 9. The measurement is then presented (arrow A404) to the user e.g. on a display of the communications device.

In some embodiments the communications device 4 can also read the measurements securely by using OSCOAP.

Figure 6:
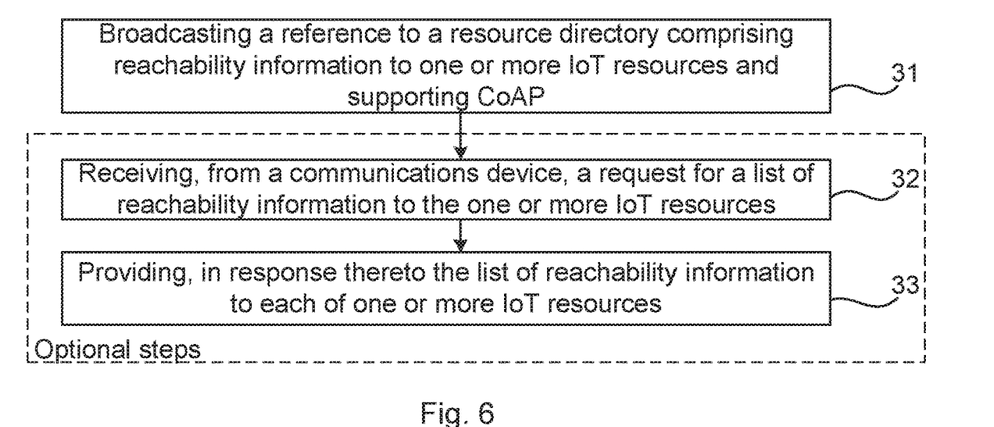
FIG. 6 illustrates a flow chart over steps of a method in a Bluetooth low energy tag in accordance with the present teachings.

FIG. 6 illustrates a flow chart over steps of a method in a Bluetooth low energy tag in accordance with the present teachings. The method 30 is used in order to provide access to IoT resources 9, in particular in order to provide communications devices 4 with direct access to such IoT resources 9. The method 30 is performed by a Bluetooth low energy, BLE, tag 2 supporting a Bluetooth wireless technology standard. The method 30 comprises broadcasting 31 a reference to a resource directory 5 comprising reachability information to one or more Internet of Things, IoT, resources 9 and supporting a Constrained Application Protocol, CoAP.

It is noted that the method 30 comprises, in its most general embodiment, only this step. In FIG. 6, two additional steps are shown (step 32 and 33), but they are optional and not necessarily included.

In the method 30 a reference to a resource directory 5 is broadcast by the BLE tag 2. This enables communications devices 4 to communicate directly with IoT resources such as e.g. temperature sensors, humidity sensors, actuators etc. This is in contrast to prior art wherein instead a reference to a website of an Internet server is broadcast. The broadcasting of the reference to the resource directory 5 enables communications devices 4 to subsequently receive e.g. measurements directly from the IoT resources using CoAP. The need to use Internet connectivity is eliminated, which may reduce costs for the user and provide an improved user experience in that a more reliable connection is provided.

The method 30 provides an improved way of providing communications devices with values from IoT resources compared to prior art methods by pointing to changing resources and enabling communications devices 4 to bookmark IoT resources.

In an embodiment, the broadcasting 31 the reference to the resource directory 5 is preceded by a symmetric key exchange process with a communications device 4. This enables an encrypted communication and thus improved security. In some embodiments, the reference to the resource directory 5 is broadcast using Object Security for CoAP, OSCoAP.

In various embodiments, wherein the BLE tag 2 comprises the resource directory 5, the method 30 comprises:
receiving 32, from a communications device 4, a request for a list of reachability information to the one or more IoT resources 9, and
providing 33 in response thereto the list of reachability information to each of one or more IoT resources 9.

In this embodiment, the resource directory 5 and the BLE tag 2 may be co-located and/or integrated, i.e. the resource directory 5 is a functionality available to the BLE tag 2. In other embodiments, the BLE tag 2 and the resource directory 5 are separate entities, and the BLE tag 2 is a simply broadcasting the reference, e.g. URL, to the resource directory 5. The reachability information may, for instance, be a CoAP URL.

In various embodiments the broadcasting 31 comprises only a reference to a resource directory 5. In particular, the broadcasting does not comprise a specific (current) value of e.g. a sensor. In order words, since the broadcasting 31 is performed without adding a varying value (e.g. a varying temperature value), the broadcasting is a non-changing reference and the communications device 5 does not need to connect to the BLE tag 2 more than once in case the resource directory 5 is available in another CoAP enabled device (separate from the BLE tag 2).

In various embodiments, the reference to the resource directory 5 comprises a Uniform Resource Locator, URL.

Figure 7:
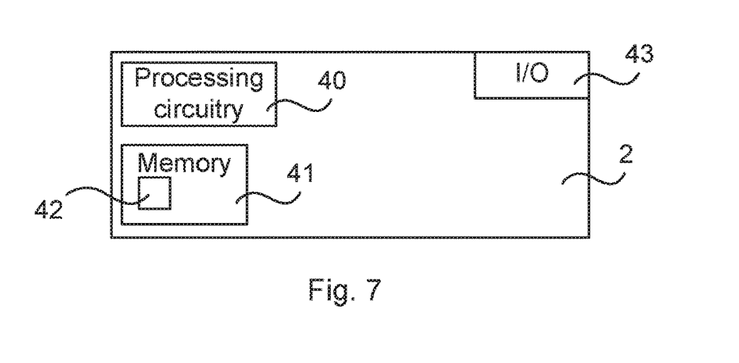
FIG. 7 illustrates a Bluetooth low energy tag and means for implementing embodiments of the method in accordance with the present teachings.

FIG. 7 illustrates a Bluetooth low energy tag and means for implementing embodiments of the method in accordance with the present teachings. The BLE tag 2 comprises processing circuitry 40, which may be any combination of one or more of a suitable central processing unit (CPU), multiprocessor, microcontroller, digital signal processor (DSP), etc., capable of executing software instructions stored in a computer program product 41, e.g. in the form of a storage medium 41. The processing circuitry 40 may further be provided as at least one application specific integrated circuit (ASIC), or field programmable gate array (FPGA).

The processing circuitry 40 is configured to cause the BLE tag 2 to perform a set of operations, or steps, e.g. as described in relation to FIG. 6. For example, the storage medium 41 may store the set of operations, and the processing circuitry 40 may be configured to retrieve the set of operations from the storage medium 41 to cause the BLE tag 2 to perform the set of operations. The set of operations may be provided as a set of executable instructions. The processing circuitry 40 is thereby arranged to execute methods as disclosed herein.

The storage medium 41 may also comprise persistent storage, which, for example, can be any single one or combination of magnetic memory, optical memory, solid state memory or even remotely mounted memory.

The BLE tag 2 also comprises an input/output device 43 for communicating with other entities such as the communication devices 4. The input/output device 43 may be an interface and may, for instance, comprise a protocol stack, for communication with other devices, in particular for Bluetooth communication. The input/output device 43 may be used for receiving data input, e.g. requests from communications devices 4, and for outputting data, e.g. broadcasting a reference to a resource directory 5. The input/output device 43 may comprise receiving circuitry and transmitting circuitry. The BLE tag 2 may also comprise an antenna device and transmission/reception circuitry for wireless communication with the communications devices 4.

A Bluetooth low energy, BLE, tag 2 is provided for providing access to IoT resources 9. The BLE tag 2 supports a Bluetooth wireless technology standard and is configured to:
broadcast a reference to a resource directory 5 comprising reachability information to one or more Internet of Things, IoT, resources 9 and supporting a Constrained Application Protocol, CoAP.

In its most simple form, the BLE tag 2 comprises only means for advertising (i.e. broadcasting) the reference to the resource directory 5 using Bluetooth wireless technology. In other embodiments, the BLE tag 2 also includes the functionality of resource directory 5, in which case the BLE tag 2 also provides the list of links of the resource directory 5 to the communications device 4 requesting the list (as has been described).

The BLE tag 2 may be configured to perform the above steps, and implement any of the described embodiments of the method, e.g. by comprising one or more processors 40 and memory 41, the memory 41 containing instructions executable by the processor 40, whereby the BLE tag 2 is operative to perform the step.

In an embodiment thus, a BLE tag 2 for providing access to IoT resources is provided. The BLE tag 2 comprises one or more processors 40 and memory 41, the memory 41 containing instructions executable by the processor 40, whereby the BLE tag 2 is operative to broadcast a reference to a resource directory 5 comprising reachability information to one or more Internet of Things, IoT, resources 9 and supporting a Constrained Application Protocol, CoAP.

In an embodiment, the BLE tag 2 is configured to broadcast the reference to the resource directory 5 following a symmetric key exchange process with a communications device 4.

In an embodiment, the Bluetooth low energy, BLE, tag 2 is configured to broadcast the reference to the resource directory 5 using Object Security for CoAP, OSCoAP.

In various embodiments, the BLE tag 2 comprises the resource directory 5 and is configured to:
 receive, from a communications device 4, a request for a list of reachability information to the one or more IoT resources 9, and
 provide in response thereto the list of reachability information to each of one or more IoT resources 9.

In various embodiments, the BLE tag 2 broadcast only a reference to a resource directory 5.

In various embodiments, the reference to the resource directory 5 comprises a Uniform Resource Locator, URL.

Figure 8:
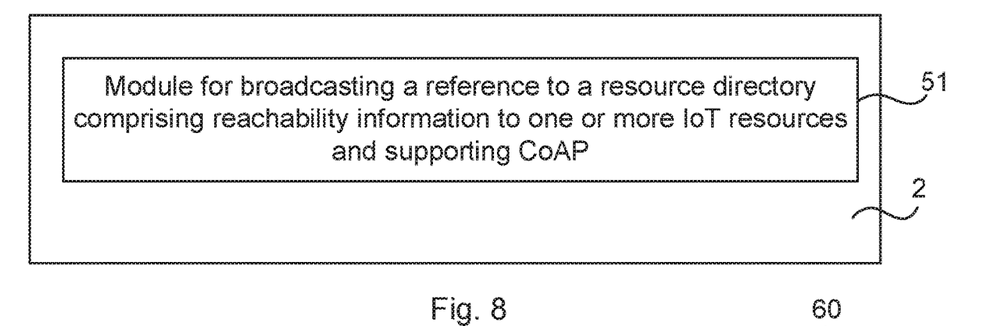
FIG. 8 illustrates a Bluetooth low energy tag comprising function modules/software modules for implementing embodiments of the present teachings.

FIG. 8 illustrates a Bluetooth low energy tag comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 that has been described in various embodiments.

A Bluetooth low energy, BLE, tag 2 is provided for providing access to IoT resources 9. The BLE tag 2 supports a Bluetooth wireless technology standard. The BLE tag 2 comprises a first module 51 or first unit 51 for broadcasting a reference to a resource directory comprising reachability information to one or more Internet of Things, IoT, resources and supporting a Constrained Application Protocol, CoAP. Such first module 51 may, for instance, comprise transmitting circuitry and antenna elements.

Figure 9:
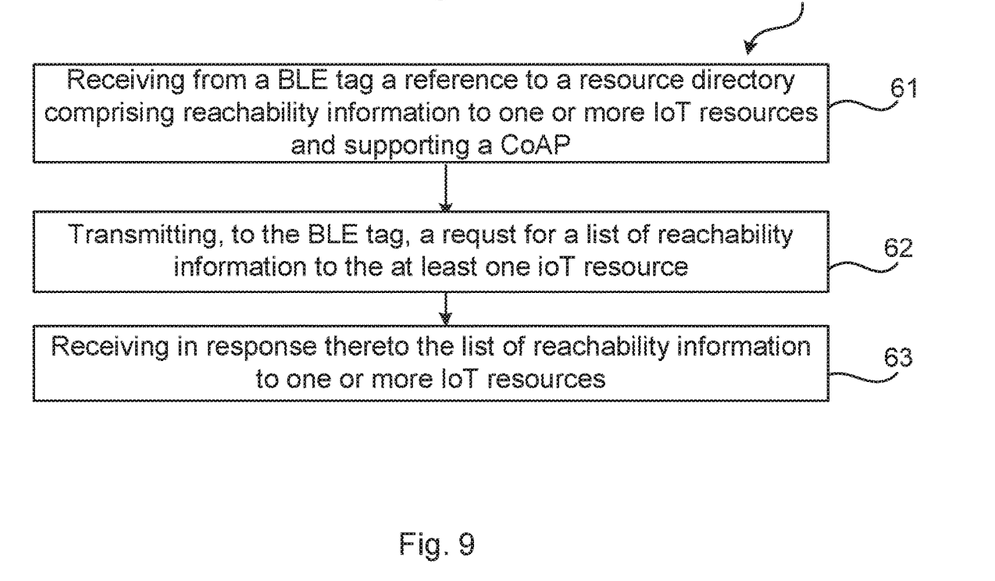
FIG. 9 illustrates a flow chart over steps of a method in communications device in accordance with the present teachings.

FIG. 9 illustrates a flow chart over steps of a method in communications device in accordance with the present teachings. A method 60 of obtaining access to IoT resources 9 is provided. The method 60 is performed by a communications device 4 and comprises:
 receiving 61, from a Bluetooth low energy, BLE, tag 2, a reference to a resource directory 5 comprising reachability information to one or more Internet of Things, IoT, resources 9 and supporting a Constrained Application Protocol, CoAP,
 transmitting 62, to the BLE tag 2, a request for a list of reachability information to the at least one IoT resource 9, and
 receiving 63 in response thereto the list of reachability information to each of one or more IoT resources 9.

In an embodiment, the receiving 61 the reference to the resource directory 5 is preceded by a symmetric key exchange process with the BLE tag 2.

In a variation of the above embodiment, the reference to the resource directory 5 is received using Object Security for CoAP, OSCoAP.

In various embodiments, the method 60 comprises using the received reachability information for obtaining information from one or more IoT resources 9. As described e.g. in relation to FIG. 5, this embodiment may comprise the communications device 4 communicating directly with the IoT resource 9, e.g. sending a GET command to the IoT resource 9 and obtaining the requested information (e.g. sensor value) in return.

In a variation of the above embodiment, the information from at least one IoT resource 9 is obtained using CoAP.

In various embodiments, the reference to the resource directory 5 comprises a Uniform Resource Locator, URL.

Figure 10:
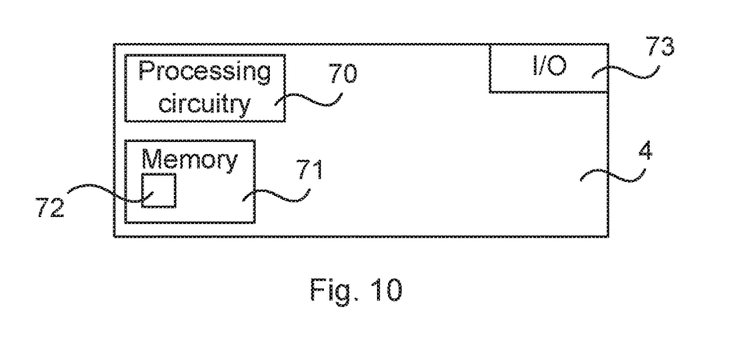
FIG. 10 illustrates a communications device and means for implementing embodiments of the method in accordance with the present teachings.

FIG. 10 illustrates a communications device and means for implementing embodiments of the method in accordance with the present teachings. The communications device comprises processing circuitry 70, which may be any combination of one or more of a suitable central processing unit (CPU), multiprocessor, microcontroller, digital signal processor (DSP), etc., capable of executing software instructions stored in a computer program product 71, e.g. in the form of a storage medium 71. The processing circuitry 70 may further be provided as at least one application specific integrated circuit (ASIC), or field programmable gate array (FPGA).

The processing circuitry 70 is configured to cause the communications device 4 to perform a set of operations, or steps, e.g. as described in relation to FIG. 9. For example, the storage medium 71 may store the set of operations, and the processing circuitry 70 may be configured to retrieve the set of operations from the storage medium 71 to cause the communications device 4 to perform the set of operations. The set of operations may be provided as a set of executable instructions. The processing circuitry 70 is thereby arranged to execute methods as disclosed herein.

The storage medium 71 may also comprise persistent storage, which, for example, can be any single one or combination of magnetic memory, optical memory, solid state memory or even remotely mounted memory.

The communications device 4 also comprises an input/output device 73 for communicating with other entities such as the BLE tag 2. The communications device 4 may comprise several protocol stacks for different wireless communications types. The input/output device 73 may be an interface and may, for instance, comprise a protocol stack, for communication with other devices, e.g. for Bluetooth communication with the BLE tag 2. The communications device 2, e.g. a smartphone may also be enabled for cellular communication (e.g. implementing Long Term Evolution, LTE standards). The input/output device 73 may be used for receiving data input, e.g. from BLE tags 2, and for outputting data, e.g. sending a request to a resource directory 5. The input/output device 73 may comprise receiving circuitry and transmitting circuitry. The communications device 4 may also comprise an antenna device and transmission/reception circuitry for wireless communication with e.g. the BLE tag 2.

A communications device 4 for obtaining access to IoT resources 9 is provided. The communications device 4 is configured to:
 receive, from a Bluetooth low energy, BLE, tag 2, a reference to a resource directory 5 comprising reachability information to one or more Internet of Things, IoT, resources 9 and supporting a Constrained Application Protocol, CoAP,
 transmit, to the BLE tag 2, a request for a list of reachability information to the at least one IoT resource 9, and receive in response thereto the list of reachability information to each of one or more IoT resources 9.

The communications device 4 may be configured to perform the above steps, and implement any of the described embodiments of the method, e.g. by comprising one or more processors 70 and memory 71, the memory 71 containing instructions executable by the processor 70, whereby the communications device 4 is operative to perform the steps.

In an embodiment thus, a communications device 4 for obtaining access to IoT resources 9 is provided. The communications device 4 comprises one or more processors 70 and memory 71, the memory 71 containing instructions executable by the processor 70, whereby the communications device is operative to:

receive, from a Bluetooth low energy, BLE, tag 2, a reference to a resource directory 5 comprising reachability information to one or more Internet of Things, IoT, resources 9 and supporting a Constrained Application Protocol, CoAP, transmit, to the BLE tag 2, a request for a list of reachability information to the at least one IoT resource 9, and receive in response thereto the list of reachability information to each of one or more IoT resources 9.

In various embodiments, the communications device 4 is configured to perform a symmetric key exchange process with the BLE tag before receiving the reference to the resource directory.

In various embodiments, the communications device 4 is configured receive the reference to the resource directory 5 using Object Security for CoAP, OSCoAP.

In various embodiments, the communications device 4 is configured use the received reachability information for obtaining information from one or more IoT resources 9.

In various embodiments, the information from at least one IoT resource 9 is obtained using CoAP.

In various embodiments, the reference to the resource directory 5 comprises a Uniform Resource Locator, URL.

Figure 11:
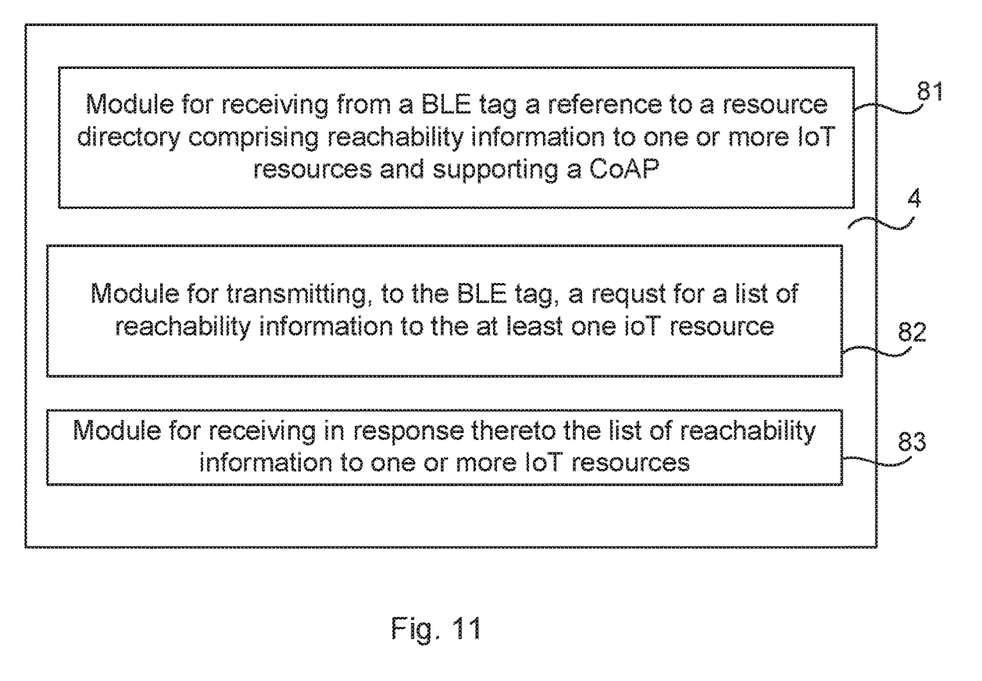
FIG. 11 illustrates a communications device comprising function modules/software modules for implementing embodiments of the present teachings.

FIG. 11 illustrates a communications device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 60 that has been described in various embodiments.

A communications device 4 is provided for obtaining access to IoT resources 9. The communications device comprises a first module 81 for receiving, from a Bluetooth low energy, BLE, tag, a reference to a resource directory comprising reachability information to one or more Internet of Things, IoT, resources and supporting a Constrained Application Protocol, CoAP. Such first module 81 may, for instance, comprise receiving circuitry and antenna means.

The communications device comprises a second module 82 for transmitting, to the BLE tag 2, a request for a list of reachability information to the at least one IoT resource 9. Such second module 82 may, for instance, comprise transmitting circuitry and antenna means.

The communications device comprises a third module 83 for receiving in response thereto the list of reachability information to each of one or more IoT resources 9.

Such third module 83 may, for instance, comprise receiving circuitry and antenna means.

It is noted that one or more of the modules 81, 82, 83 may be replaced by units.

The inventive concept has mainly been described herein with reference to a few embodiments. However, as is appreciated by a person skilled in the art, other embodiments than the particular ones disclosed herein are equally possible within the scope of the inventive concept, as defined by the appended patent claims.

The invention claimed is:

1. A method of providing access to Internet of Things, IoT resources, the method comprising:
   broadcasting a reference from a Bluetooth low energy, BLE, tag to a communications device, the reference pointing to a resource directory, the resource directory comprising information for one or more IoT resources.

2. The method as claimed in claim 1, further comprising:
   before broadcasting the reference, performing a symmetric key exchange process between the communications device and the BLE tag.

3. The method as claimed in claim 1, wherein the reference pointing to the resource directory is broadcast using Object Security.

4. The method as claimed in claim 1, further comprising:
   transmitting, from the communications device to the BLE tag, a request for a list of information for the one or more IoT resources; and
   transmitting, from the BLE tag to the communications device, in response thereto the list of information for the one or more IoT resources.

5. The method as claimed in claim 1, wherein the broadcasting comprises only a reference pointing to a resource directory.

6. The method as claimed in claim 1, wherein the reference pointing to the resource directory comprises a Uniform Resource Locator, URL.

7. A Bluetooth low energy, BLE, tag for providing access to Internet of Things, IoT resources, the BLE tag comprising a processor and a memory, the memory containing instructions executable by the processor to cause the BLE tag to
   broadcast a reference to a communications device, the reference pointing to a resource directory, the resource directory comprising information for one or more IoT resources.

8. The BLE tag as claimed in claim 7, wherein the memory contains the instructions executable by the processor to cause the BLE tag further to before broadcasting the reference perform a symmetric key exchange process between the communications device and the BLE tag.

9. The BLE tag as claimed in claim 7, wherein the memory contains the instructions executable by the processor to cause the BLE tag further to broadcast the reference pointing to the resource directory using Object Security.

10. The BLE tag as claimed in claim 7, wherein the memory contains the instructions executable by the processor to cause the BLE tag further to
   receive, from the communications device, a request for a list of information for the one or more IoT resources, and
   provide in response thereto the list of information for the one or more IoT resources.

11. The BLE tag as claimed in claim 7, wherein the memory contains the instructions executable by the processor to cause the BLE tag further to broadcast only a reference pointing to a resource directory.

12. The BLE tag as claimed in claim 7, wherein the reference pointing to the resource directory comprises a Uniform Resource Locator, URL.

13. A method of obtaining access to Internet of Things, IoT resources, the method comprising:
- broadcasting, from a BLE tag to a communications device, a reference, the reference pointing to a resource directory, the resource directory comprising information for one or more IoT resources;
- transmitting, from the communications device to the BLE tag, a request for a list of information for the one or more IoT resources;
- transmitting, from the BLE tag to the communications device, in response thereto the list of information for the one or more IoT resources.

14. The method as claimed in claim 13, further comprising:
- before broadcasting the reference, performing a symmetric key exchange process between the communications device and the BLE tag.

15. A communications device for obtaining access to Internet of Things, IoT resources, the communications device comprising a processor and a memory, the memory containing instructions executable by the processor to cause the communications device to
- receive, from a BLE tag, a reference, the reference pointing to a resource directory, the resource directory comprising information for one or more IoT resources,
- transmit, to the BLE tag, a request for a list of information for the one or more IoT resources, and
- receive in response thereto the list of information for the one or more IoT resources.

16. The communications device as claimed in claim 15, wherein the memory containing the instructions executable by the processor to cause the communications device further to before receive the reference perform a symmetric key exchange process between the communications device and the BLE tag.

17. The communications device as claimed in claim 15, wherein the memory contains the instructions executable by the processor to cause the communications device further to receive the reference pointing to the resource directory using Object Security.

18. The communications device as claimed in claim 15, wherein the memory contains the instructions executable by the processor to cause the communications device further to use the received list of information to obtain the one or more IoT resources.

19. The communications device as claimed in claim 15, wherein the reference pointing to the resource directory comprises a Uniform Resource Locator, URL.

* * * * *